Nov. 7, 1933.    C. MYERS    1,934,441
FRONT WHEEL BRAKE
Filed May 9, 1924    2 Sheets-Sheet 1
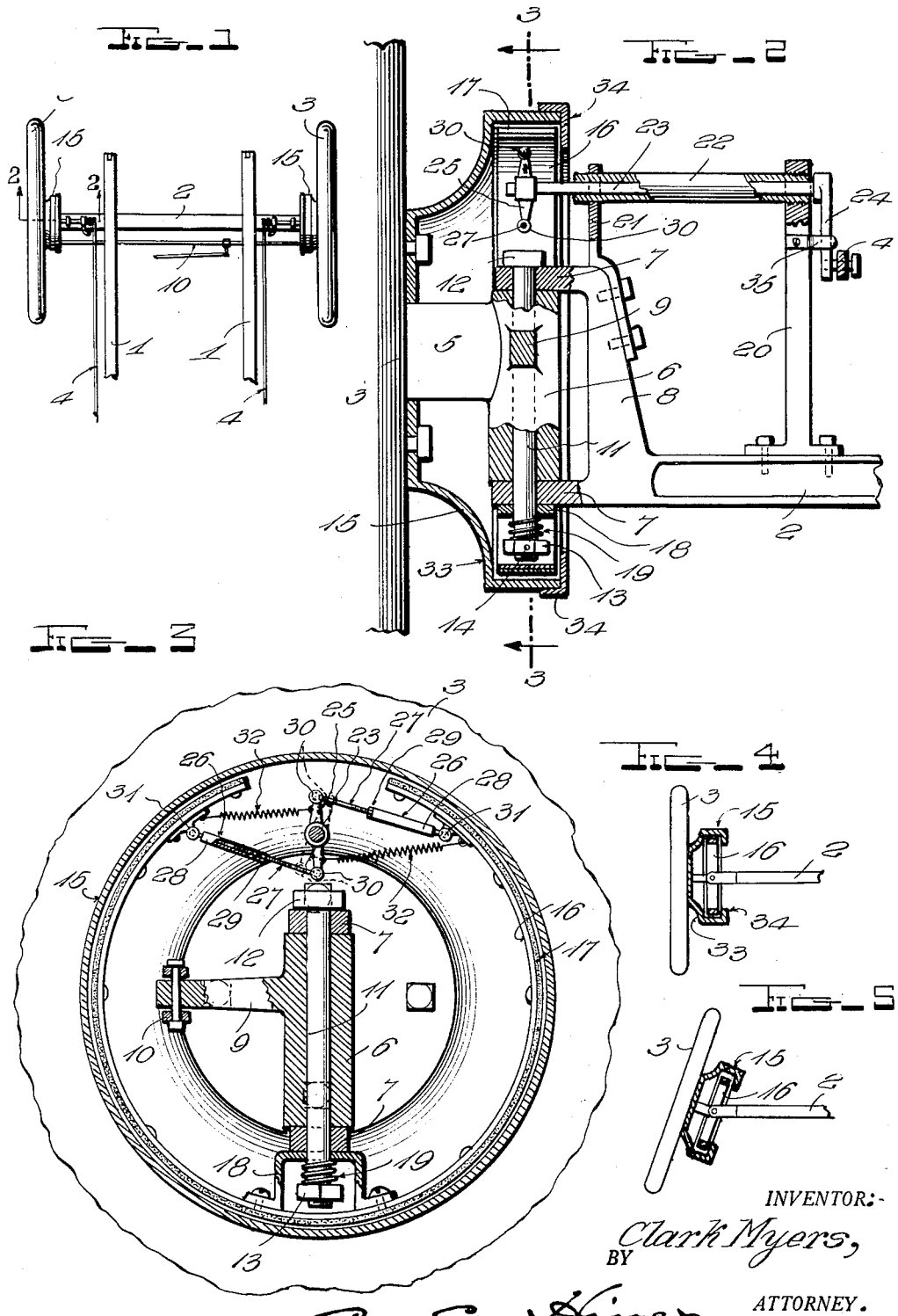
INVENTOR:-
Clark Myers,
BY
ATTORNEY.

Nov. 7, 1933.  C. MYERS  1,934,441
FRONT WHEEL BRAKE
Filed May 9, 1924  2 Sheets-Sheet 2
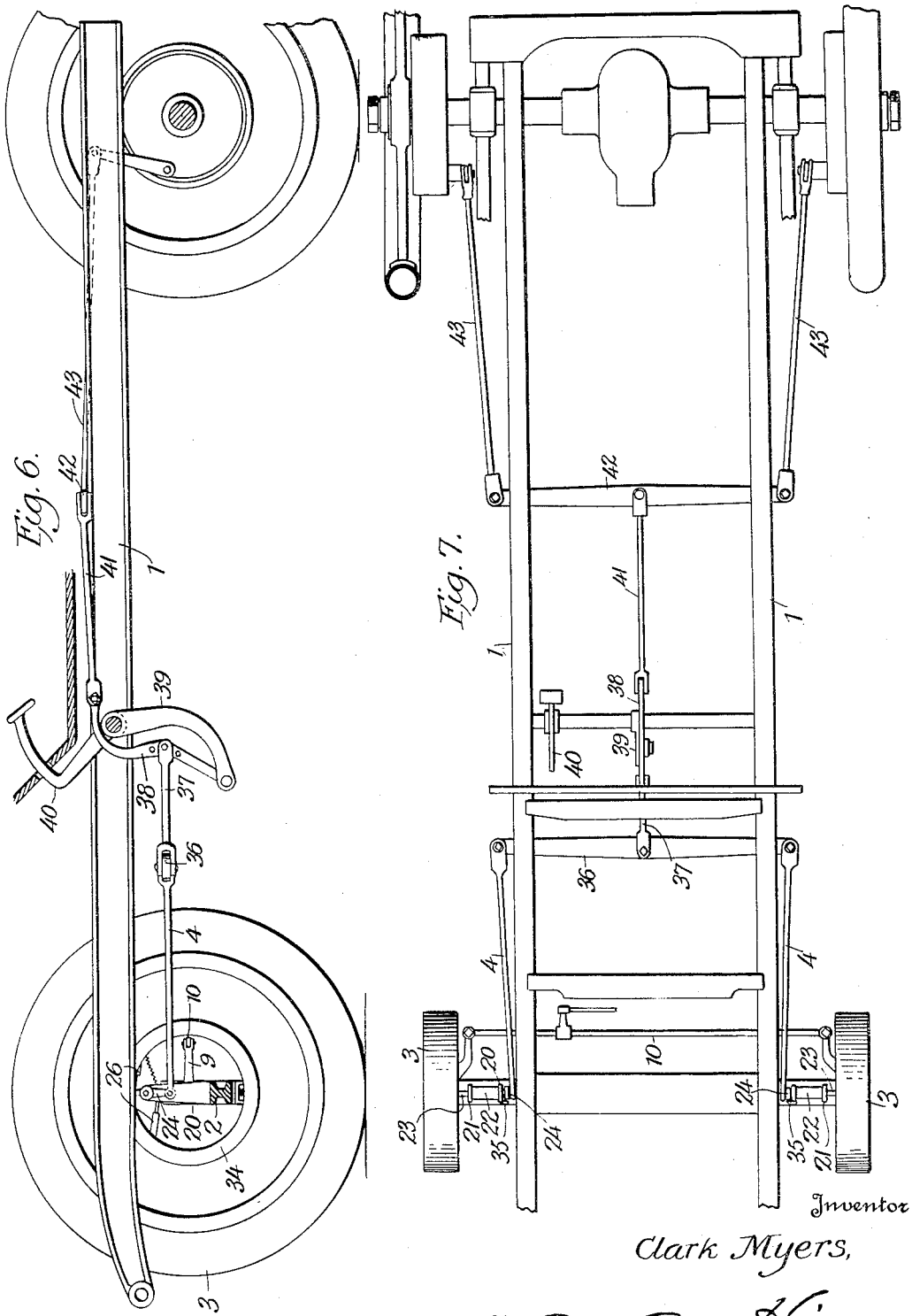
Inventor
Clark Myers,
By C. C. Hines,
Attorney Patented Nov. 7, 1933

1,934,441

UNITED STATES PATENT OFFICE 1,934,441

FRONT WHEEL BRAKE

Clark Myers, Beloit, Ohio, assignor, by mesne assignments, to Bendix Aviation Corporation, South Bend, Ind., a corporation of Delaware Application May 9, 1924. Serial No. 712,112

4 Claims. (Cl. 188—194)

This invention relates to brakes for the front steering wheels of automobiles and other vehicles, and particularly to front wheel brake mechanism which, while applicable for use in connection with front steering wheels alone, may be employed as part of a four-wheel brake system.

One object of the invention is to provide front wheel brakes which are operative only when the wheels are running in a straight line, and are automatically rendered inoperative when the wheels are turned for steering purposes, thus preventing the wheels from becoming locked or bound in the application of the brakes and causing skidding or slewing of the vehicle or any resistance to a free turning and steering movement of the wheels, necessary to secure a proper traction for the propulsion and turning of the vehicle.

A further object of the invention is to provide a front wheel brake mechanism which is simple of construction, reliable and efficient in action, and not liable to get out of order, and which may be operated in conjunction with rear wheel brakes in a four-wheel brake system.

With these and other objects in view, the invention consists of the features of construction, combination and arrangement of parts, hereinafter fully described and claimed, reference being had to the accompanying drawings, in which:—

Figure 1 is a top plan view of the front portion of the frame and running gearing of a vehicle, showing the application of the invention.

Figure 2 is a vertical transverse section, on a greatly enlarged scale, through one of the wheels and its brake device, taken on line 2—2 of Figure 1.

Figure 3 is a vertical longitudinal section taken on line 3—3 of Figure 2.

Figure 4 is a sectional diagram of parts illustrated in Figure 2, showing the positions of the parts when the wheel is running in a direction parallel with the vehicle.

Figure 5 is a view similar to Figure 4 showing the relationship of the parts when the wheel is turned for a steering action.

Figure 6 is a fragmentary view, in vertical longitudinal section, of the chassis of an automobile, showing the application of the invention in a four-wheel brake mechanism.

Figure 7 is a top plan view of the same.

In the practical embodiment of my invention, as herein disclosed, 1 designates portions of the main frame bars or chassis of an automobile or similar vehicle; 2 the front axle of the vehicle; 3 the front steering wheels of the vehicle; and 4 brake actuating rods employed in practice in conjunction with any ordinary or suitable type of brake actuating means.

As shown, each wheel 3 is mounted upon the spindle 5 of the usual steering knuckle 6 mounted between the arms 7 of the usual steering knuckle fork 8 on the axle 2, the knuckle 6 being provided with the arm 9, the arms 9 of the two knuckles being coupled for conjoint motion to a connecting rod 10 or equivalent means actuated from the steering gear of the vehicle. The knuckle 9 is mounted to swing as usual upon a knuckle pin or bolt 11 extending loosely therethrough and through the fork arms 7. This knuckle pin or bolt is provided at its upper end with a head 12 resting on the upper fork arm 7, and its lower end extends down through and below the lower fork arm 7 and is threaded to receive a retaining nut 13 which, after adjustment, may be locked in position against casual disconnection by means of a cotter pin or key or like fastening connection 14.

Fixed to each wheel 2 is a brake drum 15, and arranged within each drum for cooperation therewith is a brake shoe 16, of the split, expansible band type, provided with a suitable outer wear surface or lining 17. This band or shoe is disposed concentrically within the drum and arranged so that its brake surface may be moved into engagement with the inner surface of the flange of the drum. When the band is contracted its surface 17 lies close to but out of engagement with the brake surface of the drum, allowing the wheel to have free turning movement, and the band is adapted to be expanded by means actuated by the coacting brake rod 4 to force the surface 17 into engagement with the brake surface of the drum for a braking action on the wheel.

The brake band is disposed so that its split portion is disposed at the top thereof, and the band is provided at its bottom with a U-shaped bracket or yoke 18 fixed thereto. The crown of this yoke lies in contact with the lower fork arm 7, and such portion of the yoke is apertured for the downward passage of the lower end of the pin or bolt 11 which is received in the space bounded by the yoke. A coiled spring 19 is provided and arranged to surround the lower end of the pin between the crown of the yoke 18 and the nut 13, and this spring may be tensioned by adjustment of said nut. The yoke 18 forms a pivotal support between the base of the brake band and the pin or bolt 11, whereby the bottom of the brake band is held in proper position and whereby the brake band is mounted for swinging movements with the drum 15 on the pin or bolt 11 as an axis or center of motion. The spring 19 maintains a close engagement between the parts of the support and at the same time exerts its expansive energy to normally hold the base portion of the brake band retracted or out of engagement with the brake surface of the drum 15.

Bracket arms 20 and 21 are fixedly mounted upon the axle 2 and yoke 8 and form a support for a bearing sleeve 22 in which is journaled a rock shaft 23 carrying at its inner end a crank arm 24 which is coupled to the coacting brake actuating rod 4. The outer end of the shaft 23 extends into the drum 15 and within the space bounded by the band 17 adjacent to the upper split portion or gap thereof. To such inner end of the shaft 23 is fixed a brake band actuating lever 25, centrally fixed to the shaft and having duplicate arms extending diametrically therefrom. Between these lever arms and the ends of the band are adjustable link connections 26 each comprising a rod member 27 and a sleeve member 28. Each sleeve member is adapted to slidably receive its rod member, and each sleeve member and each rod member are respectively internally and externally threaded for engagement with each other, so that each link may be adjusted as to length to compensate for wear or to regulate the brake applying action as required, a lock nut 29 being provided to secure the members in adjusted relation and against relative movement after the proper adjustment is obtained. As shown, each rod section 27 is secured to its lever arm by a universal joint 30 and each sleeve section 28 is secured to the end of the band to which it is applied by a universal joint 31, such joints 30 and 31 being preferably of the ball and socket type, these joints being adapted to permit the links to move outwardly and inwardly for brake applying and releasing actions under the movements of the lever 25, and also adapting the links to swing laterally or at right angles to the line of motion above-mentioned in order to effect an automatic retraction of the brake band when the wheel is swung on the pin 11 for steering operations, as hereinafter described. Coiled contractile springs 32 connect the arms of the lever 25 with the respective ends of the band and serve to oppose spreading movement of the ends of the band and to assist in drawing the same inwardly for a brake releasing action.

The normal position of the parts, when the wheel 3 is disposed in a straight line parallel with the vehicle frame, and when the brake shoe is in released position, is that shown in Figure 3, from which it will be seen that the lever 25 is disposed in a straight vertical position, in which position the links 26 are at the limit of their inward motion, the parts being maintained in this position through the action of the springs 32 and the retracted position of the brake rod 4. In this position the spring 19 holds the base portion of the band also in released position. When the brake rods 4 are operated for a brake applying action, the levers 25 of the brake bands of the wheels 3 are moved to the dotted line position shown in Figure 3, whereby the links 26 are shifted outwardly against the resistance of the springs 32 to spread the brake bands and force them into braking engagement with the brake drums, the spring 19 yielding in this action to permit the base portions of the brake bands to move into contact with the drums. When the brake rods 4 are moved to retracted position, the levers 25 are restored to the position shown in Figure 3, whereby the brake bands are retracted through the inward movement of the links 26 and the contraction of the springs 19 and 32, as will be readily understood.

In order to adapt the band 16 to swing with the wheel 3 and drum 15, in the steering motions of the wheel, the band 16 is arranged to lie between portions 33 of the outer side wall of the drum and abutments 34 at the inner side of the drum, whereby the band is coupled to the drum to swing therewith and with the wheel 3 on the pin or bolt 11 as a center of motion. Any other suitable means for physically connecting the brake band with the drum for this purpose may be employed, and in practice a dust-proof cover may be used to enclose the inner open side of the drum and this cover may also be employed as the abutment in lieu of the abutments 34.

An important feature of my invention resides in the fact that while the brake bands may be applied for a braking action at all times in the running of the vehicle when the wheels 3 are traveling straight ahead and in a line parallel or substantially parallel with the vehicle frame, any material swinging movement of the wheels 3 in one direction or the other for a steering action, such as to cause the vehicle to round a curve, will effect an automatic retraction of the brake bands. This results from the fact that the band 16 maintains its position with relation to the drum 15, and swings therewith on the pin 11 and with the wheel 3, through which motion the links 26, being coupled to a lever 25 carried by the axle 2, are caused to swing laterally on the joints 30, with the result that the links assume an angular position of a character to shorten the distance between the lever 25 and the periphery of the drum 15, whereby the band is retracted and maintained in a non-braking position. Figure 4 shows diagrammatically the normal position of the parts and Figure 5 the position of the parts when the wheel is turned for a steering action. The degree of contraction of the band resulting from the lateral swinging action of the links 26 is dependent, of course, upon the degree of swinging motion of the wheels, but if this decree is at all material the band is retracted to such an extent that, even though the brake rods be adjusted to a maximum degree for a brake applying action, the spreading motion of the bands under the operation thereof will not be sufficient to cause them to engage the brake drums. Hence if the wheels are turned to any material degree for a right or left turn of the vehicle, the brake bands will be rendered inoperative for a braking action, preventing the wheels from becoming locked or bound and causing the vehicle to skid or slew. By rendering the brake bands inoperative when the vehicle is to be steered materially to the right or left, as in rounding a curve, the wheels 3 are left to revolve with maximum freedom, so that they may have the proper degree of traction or driving purchase on the ground to permit the vehicle to make the turn, a feature of importance particularly in the driving of heavy cars or vehicles, as will be readily understood. The automatic retraction of the brake bands under these conditions permits proper guidance of the vehicle around turns, while permitting of a braking action on the front wheels at all other times in the straight travel of the vehicle, braking action of the front wheels being prevented only at times when such action is undesirable. As this operation of rendering the front brake bands inoperative in steering actions is wholly automatic, no particular manipulation of the brake mechanism for the purpose on the part of the driver is required, and the rear wheel brakes may be applied in the usual way for controlling the vehicle at all times. It will thus be seen that my invention may be employed with great efficiency as a part of four-wheel brake equipment, and overcomes well known defects inherent to four-wheel equipments as previously employed.

If desired, an adjustable stop 35 may be provided on each bracket 20 to lie in the path of movement of the arms 24 so as to limit the movement of said arms and thereby prevent the levers 25 and associated links 26 from being moved beyond a predetermined band expanding position. This limit of motion may be such as to prevent the brake rods 4 from being moved to such an extent as to apply the brake bands after the bands have been retracted by lateral angular motion of the links 26 when the wheels are swung laterally for steering action. By the use of this stop excessive motion of the front wheel brake actuating mechanism beyond the normal point is prevented, so as to avoid application of the brake bands by a secondary expanding motion after they have been retracted by the aforesaid lateral motion of the links 26 upon pivotal steering motion being imparted to the wheels. When the invention is used in a four-wheel brake system this arrest of motion of the front wheel brakes will be allowed and compensated for by the usual equalizing connection, which will permit the rear wheel brakes to be applied with any force desired. While the invention may be arranged in any suitable four-wheel brake organization having an evener or differential means to permit the rear brakes to be applied without regard to my novel front wheel brake action, I have, for purpose of exemplification, shown in Figures 6 and 7 the application of my invention to such a brake organization as that disclosed in Morton Reissue Patent No. 14,155, dated June 20, 1916. As shown, the front brake rods 4 are coupled to a front equalizing lever 36 connected by a rod 37 to a secondary lever 38 coupled to a transmission lever 39 receiving motion from the foot pedal 40, the said lever 38 being also coupled by a rod 41 to the rear equalizing lever 42 to which the rear brake rods 43 are connected. This arrangement adapts all four brakes to be normally applied with equal force, but in the swinging of the front wheels for steering actions when the brakes are applied, or in the application of the brakes during a front wheel steering action, the links 26 are shifted laterally by steering force to adjust the bands to release position and the brake applying force on the bands of the front wheels, if present, is translated by such steering force into a brake releasing force, whereby the rear brakes may remain fully set while the front brakes are held fully released, as will be readily understood. Adjustment of the stops 35 permits the range of applying motion of the front wheel brakes to be regulated to any extent desired to compensate for wear or other factors in the working action of the brakes.

Having thus fully described my invention, I claim:

1. In steering wheel brakes, the combination of an axle, wheels pivoted to the axle for lateral steering motions, brake drums on the wheels, friction elements adapted to contact with said drums and being pivotally movable with the drums in their lateral steering motions, an actuating device for each friction element for contracting and expanding the latter, levers operated thereby, and means including positive connections between said levers and said friction elements for positively expanding the friction elements and for positively contracting the friction elements, said means being operative for normal braking and releasing actions when the wheels are running in a straight line and being automatically shiftable under pivotal movements of the wheel to positively contract and render the friction elements inoperative for braking actions when the wheels are swung for vehicle turning motions.

2. In a vehicle brake, a wheel pivoted to swing laterally of the line of the vehicle, a brake drum on said wheel, a friction element for engagement with the drum, a brake actuating element, a lever operated thereby, and means including positive connections between said lever and portions of the friction element for expanding and contracting the latter, said means being mounted for movement under pivotal motions of the wheel at an angle to their friction element applying and releasing motions whereby the friction element is rendered inoperative for braking action when the wheel is swung laterally in either direction.

3. In a vehicle, a pair of steering wheels pivoted to swing laterally of the line of the vehicle, a brake drum on each of said wheels, a friction element for engagement with each drum, a brake actuating element for each friction element, motion transmitting elements operated thereby and links inseparably and articulatedly connected with said motion transmitting element and the ends of the friction element for normal expanding movement when the actuated element is operated and the wheel is traveling in a straight line parallel with the vehicle, said links having a movement at an angle to said normal movement for preventing operation of the friction element when the wheel is swung laterally of the line of the vehicle in either direction.

4. In a brake mechanism for vehicles, a front axle, front steering wheels pivoted to the axle to swing laterally of the line of the vehicle, brake devices operative on each said wheel, brake applying means for each device, means for equalizing the pressures of said brake applying means, sets of motion transmitting devices between said brake applying means and the respective brake devices of the respective wheels, said sets of motion transmitting devices including members inseparably connecting the applying means with the brake devices, said connecting members being normally movable in a direction parallel with the vehicle when the wheels are travelling in a straight line to transmit the applied braking force to set the brakes, and the said connecting members being movable at an angle to their first named direction of movement to release the brakes when the wheels are swung for travel of the vehicle around the curve.

CLARK MYERS.